Patented Nov. 9, 1943

2,333,950

UNITED STATES PATENT OFFICE 2,333,950

THERAPEUTIC PECTOUS PRODUCT

Aksel G. Olsen, Summit, and Thomas M. Rector, Morristown, N. J., assignors to General Foods Corporation, New York, N. Y., a corporation of Delaware No Drawing. Application December 19, 1940, Serial No. 370,902

4 Claims. (Cl. 167—82)

This invention relates to therapeutic pectous preparations and particularly to such preparations adapted for oral administration.

Powdered pectin and pectin solutions have been found of specific benefit in the treatment of infected wounds, diarrheal conditions, severe burns, gingivitis, etc. It is believed that these benefits result from the ability of the pectous substance to adsorb or neutralize toxic elements as well as to form a soothing gelatinous coating covering the affected tissues.

One of the commonly accepted requirements for successful pectin therapy is that the treatment be continuous and prolonged. In the case of gastric or intestinal conditions the ingestion of pectous solutions provides an effective means of subjecting the gastrointestinal tract to prolonged treatment. Open external wounds or burns may be sprinkled with finely powdered pectin, which will absorb moisture from the wound and form a continuous gelatinous coating over the wound.

Deep wounds may be packed with gauze soaked in a pectous solution and wet pectinized bandages may be used to cover the more superficial wounds and burns. Likewise, pectous pastes may be used to fill ulcers, bedsores, etc.

In all of the above cases the pectous substance remains in contact with the infected area over a long period of time. However, this requirement is difficult to meet in the case of afflictions of the oral cavity such as sore throat, infected gums, laryngitis, and similar conditions, because the normal flow of saliva tends to remove any protective coating formed by the application of the pectous preparation to the inflamed area. Hence if substantial benefit is to be derived from the treatment, it is necessary that the protective coating be renewed as rapidly as it is removed.

We have found such renewal of the protective coating can be achieved by administering the pectous substance in the form of a powder dispersed throughout a solid, slowly dissolving matrix.

The matrix may be composed of any edible and preferably non-irritating substance, but in commercial practice it is desirable that it be stable, have a pleasant taste, and be adapted for use in convenient tablet form. Many substances suitable for this purpose are known in the pharmaceutical art, perhaps the most common being sugar in its various forms.

The pectous substance used may be any of the commercially available pectins or derivatives or salts of such pectins or of pectic acid, such as the alkaline earth pectinates and pectates or organic base derivatives of the type including triethanolamine pectinate, ephedrine pectate and pectinate, quinine pectate, etc. Pectous compounds of the latter type may be preferred in some cases where a therapeutic effect in addition to that of the pectin is desired.

Any of the known methods for forming tablets or lozenges may be employed in preparing therapeutic products embodying the present invention. For example, the pectous substance in powdered form may be thoroughly mixed with the matrix substance and any other suitable ingredients such as color and flavor and the mixture pressed to form tablets of the desired size and shape. Alternatively the powdered pectous substance can be mixed into a suitable melted matrix and the resulting mixture, with or without other ingredients, poured into suitable molds or otherwise cast into any desired size and shape to form a product having the characteristics of hard candy. Either method results in the formation of a solid tablet having the powdered pectous substance dispersed throughout a slowly dissolving matrix.

The following specific examples will serve to illustrate the invention in greater detail:

Example 1

|  | Parts |
| --- | --- |
| Sugar | 450 |
| Water | 100 |
| Cream of tartar | 0.4 |
| Fruit acid | 0.15 |
| Pectin | 50 |

A solution of the sugar and cream of tartar in the water is heated to about 130° C. at which time the acid is added and the heating continued until the temperature reaches approximately 155–160° C. At this point the syrup is removed from the fire, the pectous substance is stirred in, and the mixture is cast into the desired form. The foregoing procedure provides a product of suitable hardness and rate of solution, but it will be understood that the hardness can be varied by suitable changes in the acid ingredients or in the temperature to which the mixture is heated.

If desired, various flavoring ingredients and supplemental therapeutic substances may be incorporated in the product to enhance palatability and to provide additional therapeutic effects. For example, chocolate, oil of wintergreen, mint, menthol, hexylresorcinol, quinine, ephedrine, etc., may be added and many others will readily suggest themselves to those skilled in the art.

The following two illustrations are representative of such modified products:

Example 2

| | Parts |
|---|---|
| Sugar | 450 |
| Water | 100 |
| Cream of tartar | 0.4 |
| Citric acid | 0.15 |
| Chocolate liquor | 50 |
| Ephedrine pectate | 50 |

The procedure is the same as in Example 1, the chocolate being stirred in after the temperature reaches 155–160° C.

Example 3

| | Parts |
|---|---|
| Sugar | 450 |
| Water | 100 |
| Cream of tartar | 0.4 |
| Citric acid | 0.15 |
| Chocolate liquor | 50 |
| Calcium pectinate | 50 |
| Menthol crystals | 0.75 |

The procedure is the same as in Example 2, the menthol being stirred into the mix just prior to casting.

When products of the foregoing character are held in the mouth a slow dissolution of the matrix takes place, resulting in a gradual and continuous exposure of the dispersed pectous particles. In this way a continuing supply of the pectous substance is made available for continuous application to the area undergoing treatment. It will be evident that the length of treatment will be governed by the time required for the tablet to dissolve completely. Accordingly variations in the degree of hardness of the matrix and in the size of the tablet can be made to procure a treatment interval of any convenient length.

What is claimed is:

1. A therapeutic product for the treatment of afflictions of the oral cavity by forming and maintaining a protective pectous coating over the area to be treated and comprising a solid, edible matrix containing particles of a comminuted pectous substance dispersed throughout its mass, said matrix dissolving slowly in the mouth but more rapidly than said particles and gradually exposing said particles at its surface to form said coating and to maintain it by the continuous exposure of additional particles to replace the pectous substance carried away from said coating by the saliva.

2. A therapeutic product for the treatment of afflictions of the oral cavity by forming and maintaining a protective pectous coating over the area to be treated and comprising a solid, edible matrix containing particles of powdered pectin dispersed throughout its mass, said matrix dissolving slowly in the mouth but more rapidly than said particles and gradually exposing said particles at its surface to form said coating and to maintain it by the continuous exposure of additional particles to replace the pectin carried away from said coating by the saliva.

3. A therapeutic product for the treatment of afflictions of the oral cavity by forming and maintaining a protective pectous coating over the area to be treated and comprising a solid, edible matrix containing particles of a finely divided, edible alkaline earth metal salt of a pectous substance dispersed throughout its mass, said matrix dissolving slowly in the mouth but more rapidly than said particles and gradually exposing said particles at its surface to form said coating and to maintain it by the continuous exposure of additional particles to replace the pectin carried away from said coating by the saliva.

4. A therapeutic product for the treatment of afflictions of the oral cavity by forming and maintaining a protective pectous coating over the area to be treated and comprising a solid, edible matrix containing particles of a pectous substance combined with an organic base having therapeutic value and dispersed throughout its mass, said matrix dissolving slowly in the mouth but more rapidly than said particles and gradually exposing said particles at its surface to form said coating and to maintain it by the continuous exposure of additional particles to replace the pectin carried away from said coating by the saliva.

AKSEL G. OLSEN.
THOMAS M. RECTOR.